United States Patent
Hasbrouck et al.

(10) Patent No.: US 12,335,739 B2
(45) Date of Patent: Jun. 17, 2025

(54) PROOF OF LOCATION AND VELOCITY BLOCKCHAIN CONSENSUS MECHANISM SYSTEM AND METHOD

(71) Applicant: SPACE TELECOMMUNICATIONS, INC., Melbourne, FL (US)

(72) Inventors: Scott Hasbrouck, West Melbourne, FL (US); Tae Lim Oh, Seongnam-si (KR)

(73) Assignee: Space Telecommunications, Inc., Newark, DE (US)

( * ) Notice: Subject to any disclaimer, the term of this patent is extended or adjusted under 35 U.S.C. 154(b) by 0 days.

(21) Appl. No.: 18/745,786

(22) Filed: Jun. 17, 2024

(65) Prior Publication Data

US 2025/0031049 A1    Jan. 23, 2025

Related U.S. Application Data

(63) Continuation of application No. PCT/US2024/034244, filed on Jun. 15, 2024.

(60) Provisional application No. 63/521,095, filed on Jun. 15, 2023.

(51) Int. Cl.
| | |
|---|---|
| *H04W 12/63* | (2021.01) |
| *H04L 9/00* | (2022.01) |
| *H04W 64/00* | (2009.01) |

(52) U.S. Cl.
CPC .............. *H04W 12/63* (2021.01); *H04L 9/50* (2022.05); *H04W 64/003* (2013.01)

(58) Field of Classification Search
CPC ........ H04W 12/63; H04W 64/003; H04L 9/50
See application file for complete search history.

(56) References Cited

U.S. PATENT DOCUMENTS

| | | | | |
|---|---|---|---|---|
| 10,433,115 | B1* | 10/2019 | Levatte | H04L 67/104 |
| 11,321,282 | B2* | 5/2022 | Tran | H04B 7/0413 |
| 11,403,281 | B2* | 8/2022 | Huang | G06F 16/2379 |
| 2008/0280625 | A1* | 11/2008 | Larsen | G01S 5/0226 |
| | | | | 455/456.1 |
| 2015/0139213 | A1* | 5/2015 | Abraham | H04L 69/28 |
| | | | | 370/338 |
| 2015/0215762 | A1* | 7/2015 | Edge | H04W 8/005 |
| | | | | 370/338 |
| 2018/0225651 | A1* | 8/2018 | Stone | G06Q 20/12 |

(Continued)

*Primary Examiner* — Steven S Kelley
(74) *Attorney, Agent, or Firm* — Lowndes; Stephen C. Thomas

(57) ABSTRACT

A system and method providing Proof of Location or Proof of Location and Velocity consensus in a blockchain network using radio frequency (RF) signals. Nodes validate the location of other nodes in the network using PING-PONG round trip signal propagation time to determine maximum distances to other nodes. These maximum distances are then shared between nodes, whereupon the nodes use computational techniques to resolve validated, geospatial location of the other nodes. The sharing of measured maximum distances to local nodes is a form of Proof of Location consensus. The validated geospatial locations (and velocities) of local nodes are then written to the blockchain, creating a time history for each node. This information may be used by the blockchain operating rules to implement any number of security and other operational functions. The ability of the invention to operate without need for time synchronization between nodes is an advantage of the system.

21 Claims, 7 Drawing Sheets

(56) References Cited

U.S. PATENT DOCUMENTS

| | | | |
|---|---|---|---|
| 2019/0199518 A1* | 6/2019 | Rady | H04L 9/3226 |
| 2019/0204407 A1* | 7/2019 | Heurguier | H04W 64/003 |
| 2019/0253134 A1* | 8/2019 | Coleman | H04B 7/18519 |
| 2020/0034839 A1* | 1/2020 | Soundararajan | G06Q 20/4014 |
| 2020/0167512 A1* | 5/2020 | Chitra | G06Q 50/06 |
| 2020/0322041 A1* | 10/2020 | Chao | H04W 4/44 |
| 2021/0092613 A1* | 3/2021 | Palyutina | G06Q 50/265 |
| 2021/0208860 A1* | 7/2021 | Freeman | G06F 9/5055 |
| 2021/0319411 A1* | 10/2021 | Tyler | G06F 21/645 |
| 2022/0070082 A1* | 3/2022 | Hall | H04L 12/437 |
| 2022/0159535 A1* | 5/2022 | Rahman | H04L 9/0643 |
| 2022/0322276 A1* | 10/2022 | Karlgaard | G01S 5/14 |
| 2022/0326372 A1* | 10/2022 | Jordanides | H04L 9/50 |
| 2022/0358031 A1* | 11/2022 | Yanamala | G06F 11/3688 |
| 2023/0124157 A1* | 4/2023 | Mikonis | H04L 45/26 |
| | | | 370/252 |
| 2023/0216691 A1* | 7/2023 | Li | H04L 9/3297 |
| | | | 713/176 |
| 2024/0113902 A1* | 4/2024 | Michaelis | H04L 63/04 |
| 2024/0127059 A1* | 4/2024 | Tinsley | G06N 3/08 |
| 2024/0217383 A1* | 7/2024 | Ropel | H04L 9/50 |
| 2024/0236698 A1* | 7/2024 | Lanfranchi | H04W 12/069 |
| 2024/0259100 A1* | 8/2024 | Rakshit | H04B 10/29 |
| 2024/0273482 A1* | 8/2024 | Singh | H04L 9/50 |
| 2024/0414015 A1* | 12/2024 | Gagliardoni | H04B 7/18513 |

\* cited by examiner

Node Architecture

PROOF OF LOCATION AND VELOCITY BLOCKCHAIN CONSENSUS MECHANISM SYSTEM AND METHOD

CROSS-REFERENCE TO RELATED APPLICATIONS AND INCORPORATION BY REFERENCE

This patent application filed in the United States Patent and Trademark Office (USPTO) is a non-provisional of, and claims benefit of priority to, U.S. provisional patent application No. 63/521,095, entitled PROOF OF LOCATION BLOCKCHAIN CONSENSUS MECHANISM SYSTEM AND METHOD, which was filed in the USPTO on Jun. 15, 2023, and which is incorporated by reference herein in its entirety; this patent application is also a continuation of International Application number PCT/US24/34244, filed under the Patent Cooperation Treaty (PCT) in the USPTO Receiving Office on Jun. 15, 2024, entitled PROOF OF LOCATION AND VELOCITY BLOCKCHAIN CONSENSUS MECHANISM SYSTEM AND METHOD, which is also incorporated by reference herein in its entirety.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISK

Not applicable.

BACKGROUND OF THE INVENTION

Field of the Invention

The field of the invention relates generally to systems and methods for reaching consensus (sometimes called Byzantine consensus) regarding the geospatial location (or velocity or both) of nodes of a blockchain network in a defined three-dimensional space using radio frequency (RF) location means. Once the geospatial location of a node in the three-dimensional space has been independently determined by a validating node using the location consensus system and method described herein, the validating node may then add the verified location of the node to the blockchain ledger, whereupon the rules of the blockchain system may validate that node, i.e. determine whether that node is authentic, and therefore able to write blocks to the blockchain, or perform other blockchain operations. More precisely, the invention relates to systems and methods for reaching Byzantine consensus regarding the authenticity or validity of a proposed block of data by verifying, by consensus reached by a determined minimum number of validating nodes, the geospatial location of the proposing node.

Background Art

Blockchain systems are a form of distributed ledger that have need for verifying that the data in the ledger is accurate (i.e., the data to be added to the blockchain has not been tampered with or corrupted, whether such tampering is malicious or not malicious). In a blockchain system, nodes of the blockchain propose to add blocks of information to the blockchain. For example, in blockchain systems that are directed to managing financial transactions, blocks of data may contain information regarding a transfer of wealth including such information as the sending party identification, the receiving party identification, the date and time of the transfer, and any other parameters of the transfer. However, in order for the blockchain to be effective, only validated, authentic, trustworthy data should be added to the blockchain ledger. Thus, blocks of data to be added to the blockchain must somehow be validated before they are allowed to be permanently added to the distributed blockchain ledger. One way of doing this is to validate the source of the data.

The challenge of proposed data block validation for data in in a distributed (i.e. decentralized) blockchain network has been attributed to being analogous to the "Byzantine Generals Problem", in which attacking Byzantine generals must use limited information available to them to reach consensus over some value, such as an order to attack or retreat so that all honest follower generals reach the same decision; and to ensure that if the commanding general is honest, all honest follower generals agree to follow the commanding general's order. This Byzantine scenario has been cited as being analogous to a malicious user attempting to add a non-authentic or even harmful blocks of data to a blockchain ledger. An example of a non-authentic or harmful block of data is a block containing instructions for transfer of funds from one user to another user, in which the transfer is not authorized by either of the users. This is but one of many possible examples of non-authentic, or harmful, blocks.

The goal of the consensus mechanism of a blockchain system is to provide a protocol (i.e., a method) for appending new blocks to the blockchain ledger, given a network of nodes who each have a local view of the ledger. The protocol ensures that the subset of nodes who are honest and who receive a new block proposal will always have a local view of the ledger that is consistent with all other nodes' local view of their respective ledgers. Second, the consensus mechanism also ensures that whenever an honest node sends (as opposed to receiving) a new block proposal, that all honest recipients will commit to that block. The goal of the consensus mechanism is to ensure that this works even in the presence of one or more dishonest nodes whose identities are not known a priori, and who may behave in a variety of undesirable ways, including: failing to respond to messages, sending arbitrary messages, sending messages at random intervals, or any other behavior that violates the protocol directly or indirectly.

Thus, a blockchain is a vital data structure that facilitates a Byzantine fault tolerant network to successfully operate in a public, permissionless setting. A consensus mechanism is a method, which may be, for example, an algorithm in the form of a non-transitory computer readable medium (i.e. a "memory") storing instructions that when used in blockchain systems, achieve distributed agreement about the ledger's state. Because consensus mechanisms must operate in real-time in real world blockchain networks (imagine a financial retail transaction which is to be completed using a cryptocurrency based on blockchain, in which the buyer must wait for confirmation of the transaction before being able to complete the transaction and move on to other business), it may be important that the consensus mechanism is able to operate quickly. Further, because the transactions embedded in the blockchain ledger become permanent once the blocks are validated, the consensus mechanism itself should be "spoof-proof", i.e. secure from malicious manipulation. Further, all blocks validated in previous rounds of consensus should be immutable. This immutability is the reason for choosing the blockchain as the underlying structure of the database.

Finally, consensus mechanisms are a critical part of a blockchain network, because in a blockchain network there is no central authenticating or validating authority. Thus, at least some nodes of the network must do the validation (these are "validating nodes"). The validation of proposed blocks of data by at least a portion of the nodes on the blockchain network does not generally go unrewarded. Nodes that participate in a consensus validation of proposed blocks of data are typically financially rewarded by a transfer of some value to them by the blockchain network. As an example, validating nodes in the Bitcoin® network (called "miners") are allowed to append a transaction to the end of a block in which a predefined reward amount is "minted". The reward amount is referred to as the "block reward".

There are, in the art, various types of algorithms for use in validating proposed blocks. For instance, the Bitcoin blockchain uses a consensus mechanism that relies on a rate-limiting process referred to as "Proof-of-Work" (PoW), which requires computational power provided by computer-based "miners" to solve an encrypted puzzle, called the hash. After the hash is solved by one miner (or a group of miners working together), Bitcoin's PoW requires that every node on the network verify the data that has been changed by checking the data structure, the block header hash, the block timestamp, the block size and the first transaction. It then completes a long transaction verification checklist. This verification takes much less time than the process of solving the hash, which is called mining, and is orders of magnitude less time-consuming than human verification. PoW requires a participant node to prove that the work done and submitted by them qualifies them to receive the right to add new transactions to the blockchain. One advantage of the PoW rate-limiting process is that it operates to prevent a single node from pretending to be multiple nodes in the blockchain network, thus becoming a majority in the network (known as a "Sybil" attack). To prevent this, rate limiting processes such as PoW add a cost to consensus participation. In the case of Proof of Work, the cost is electricity. A drawback of the PoW mechanism is that the use of the POW rate-limiting mechanism requires very large, and increasingly larger, energy consumption and long processing times. For example, it takes on average ten (10) minutes to verify every Bitcoin block, which can be a significant downside, for example, in a typical retail transaction. Further, because PoW consensus mechanisms require high amounts of power to operate, they are not friendly to the natural environment due to use of hydrocarbon and other fuels to generate the electrical power such systems require.

Proof of stake (POS) is another common consensus mechanism algorithm that evolved as a low-cost, lower-energy consuming alternative to the PoW algorithm. It involves allocating responsibility in maintaining the public ledger to a participant node in proportion to the number of virtual currency tokens held. However, this has the drawback that it incentivizes hoarding instead of spending. This mechanism is also permissioned instead of permissionless; a new participant cannot just immediately join the network and begin participating in consensus.

Proof of History (PoH) is another consensus mechanism that was developed by the Solana Project. It is similar to Proof of Elapsed Time (PoET), which encodes the passage of time itself cryptographically to achieve consensus without expending a large amount of resources.

There are other consensus mechanism algorithms, as well, such as for example Proof of Capacity (PoC) which allow sharing of memory space of the contributing nodes on the blockchain network. The more memory or hard disk space a node has, the more rights it is granted for maintaining the public ledger. Proof of Activity (PoA), used on the Decred blockchain, is a hybrid that makes use of aspects of both POW and PoS. Proof of Burn (PoB) requires transactors to send small amounts of cryptocurrency to inaccessible wallet addresses, in effect "burning" them out of existence. Still further, other consensus mechanism algorithms have been created, such as delegated proof of stake, proof of importance, proof of elapsed time, proof of authority, and proof of capacity.

All of these consensus mechanisms have certain drawbacks that are specific to each one. For instance, PoW consensus mechanisms, such as used for Bitcoin, are computationally intensive and they have a negative effect on the natural environment due to the continuously increasing need for electric power to support the required data mining. Ideally, a consensus mechanism would allow for inexpensive participation while remaining decentralized and resistant to Sybil attack, and would also be permissionless. The prior systems do not achieve these goals. For example, PoS and its variants are permissioned, Solana is scalable but is far more centralized, and so on. The concept that competing but desired attributes create challenges for blockchain system design has been referred to as the "scalability trilemma", which essentially states that there are three properties, namely scalability, decentralization, and security, that a blockchain should try to achieve, and that, using "simple" techniques, one can only achieve two of those three. The term "scalability trilemma" was proposed by Vitalik Buterin, the inventor of Etherium and co-founder of Bitcoin Magazine.

What is needed in the art, therefore, is a consensus mechanism that does not require vast amounts of processing power, is scalable, operates quickly to reach consensus as to the validity of a proposed blockchain block, is secure (e.g. resistant to spoofing or tampering, provides security against appending of corrupted blocks of data to the distributed blockchain ledger), and operates as a decentralized system.

BRIEF SUMMARY OF THE INVENTION

The present invention comprises a system and method that have one or more of the following features and/or steps, which alone or in any combination may comprise patentable subject matter, and which overcome the aforementioned drawbacks of systems and methods of the prior art.

The present invention is a novel system and method for using radio frequency (RF) signal location finding to determine a verified geospatial position for a node in a blockchain network. That verified geospatial position information may be used to 1) determine whether a node is authentic, i.e., validate the node, and thus allowed to write blocks to the blockchain, and 2) apply blockchain operating rules to the operation of nodes on the network.

In an embodiment, the nodes of the blockchain network work as validating nodes by: 1) determining their own geospatial position; 2) determining, via means described below, the distance from their geospatial position to the geospatial position of other local nodes of the network, establishing a "lightsphere" for each local node relative the geospatial position of the validating node, 3) broadcasting the lightsphere information (which may comprise the validating node's geospatial position and the lightsphere radius for each other local node) to the other local nodes; 4) receiving this same type of information from the other local nodes and then applying computational algorithms to determine if a geospatial position of each of the other local nodes may be determined within a specific margin of error, and if so, determining that such local nodes are validated local nodes; and 5) writing the geospatial position and, in embodiments, the measured lightsphere distances of the validated local nodes to the blockchain. Over time, the blockchain distributed ledger becomes populated with a history of the geospatial location and measured distances of each node of the network, which can be used for any number of purposes and applications, examples of which are provided below and all of which are within the scope of the claimed invention.

Once a node's geospatial location has been validated by the system and method of the invention, and recorded in the blockchain, that node may, in embodiments, be considered by the operating rules and code of the blockchain to be a validated, or trustworthy, node, such that the node is able to write blocks to the blockchain for any purpose allowed by the blockchain rules. For example, and not by way of limitation, the blockchain may be one that is used to carry out financial transactions; record data of any type; or any other use that a user could conceive for use of a blockchain system. In such applications, a node whose location has been verified by the Proof of Location (PoL) system and method of the invention may be considered trustworthy and thus be allowed to write blocks to the blockchain. In the example in which the blockchain is used for financial transactions, those blocks may contain, for example, instructions for the transfer of funds between users of the blockchain.

When both Proof of Location and Proof of Velocity by measuring the doppler shift are applied, the system and method will herein be referred to as Proof of Location and Velocity (PoLV). When embodiments of the present invention are only utilizing lightsphere delays, it can be referred to as Proof of Location or PoL.

The validating nodes of the system use a novel system and method of distributed radio location to determine the geospatial location of other nodes desiring to become validated, or in other words, authenticated ("proposing nodes"). In an embodiment of the system and method of the invention, each validating node and proposing node may, generally, execute the method steps set forth below.

a) In a first step, each node may determine its own geospatial position in a three-dimensional frame of reference, using known systems and methods. For example, nodes may utilize satellite navigation systems such as the United States' Global Positioning System (GPS), Russia's Global Navigation Satellite System (GLONASS), China's BeiDou Navigation Satellite System, or the European Union's Galileo to determine their location; they may use inertial navigation techniques to determine their location; they may receive location information from ground tracking systems, or they may use or any combination of these systems and methods, or other methods that are known in the art to determine their own geospatial position.

b) In a second step, each validating node may determine the distance to proposing nodes nodes that are within radio communication range (nodes that are withing radio communication range being "local nodes") using a PING-PONG approach, defined below, and measuring round-trip RF signal travel time. In this manner each validating node may determine a maximum distance to a proposing node or to any local node. At this point each validating node does not yet know the geospatial location of its local nodes, only the maximum distance to its local nodes, essentially defining a sphere having a center at the node, and a radius equal to the determined distance to the local nodes. This sphere may be termed a "lightsphere".

c) In a third step, each validating node may transmit an RF signal that is receivable by its local nodes, including a proposing node ("ECHO" signal). The ECHO signal contains identifying information for the validating node, and the lightsphere information for the validating local nodes as determined by the validating node. Each validating node carries out this same process, so that each of the local nodes receives ECHO signals from the other local validating nodes. Thus, each of the local nodes knows 1) its own location; 2) the maximum distance from it to the other local nodes; and 3) the maximum distance from each of the other local nodes to each other local node.

d) In a fourth step, computational techniques are applied by each validating node (which computation may occur onboard or offboard the validating node, which would be the case, for example, in which the validating nodes have limited available processing power and are adapted to use off-board processors to perform data processing) to determine the geospatial location of the proposing node. If the geospatial location of a proposing node is determined within a pre-determined margin of error, that proposing node may be deemed "validated". The validating node will then write the location of the now-validated local nodes (but, in embodiments, not its own geospatial location) to the blockchain.

e) Steps a.-d. may then be repeated over time, with the result that a time history of verified geospatial location information for each validated node is written to the blockchain.

f) This time history of verified geospatial location information for each node is then used to determine which blockchain operations a validated node will be able to perform, using the blockchain rules for a specific application. For example, if a node is determined to be authentic, i.e. validated, the blockchain rules may allow that validated node to write blocks of data to the blockchain until such time as the node is no longer validated (i.e. the node is no longer authenticated).

In other embodiments, the nodes of the system can also use a novel system and method of distributed radio location to determine the geospatial relative velocity of the other nodes, by means of measuring the doppler effect shift of the PONG from another node. In this embodiment of the system and method of the invention, each node may, generally, execute the method steps set forth below to determine the relative rates or velocities of the other nodes.

g) In a first step, each node may determine its own geospatial position and velocity vector in a three-dimensional frame of reference, using known systems and methods. For example, nodes may utilize satellite navigation systems such as the United States' Global Positioning System (GPS), Russia's Global Navigation Satellite System (GLONASS), China's BeiDou Navigation Satellite System, or the European Union's Galileo to determine their location and velocity; they may use inertial navigation techniques to determine their location and velocity; they may receive location and velocity information from ground tracking systems, or they may use or any combination of these systems and methods, or other methods that are known in the art to determine their own geospatial position and velocity.

h) In a second step, each node may determine the relative velocity to other nodes that are within radio communication range ("local nodes") using a PING-PONG approach, defined below, and measuring the doppler shift from the center frequency of the received radio signal. In this manner each node may determine the current relative velocity in addition to the a maximum distance to its local nodes, with no additional information or radio broadcasts other than the PING-PONG method, as set forth above in steps a)-f). At this point each node knows the relative velocity of other local nodes within radio range, in addition to the maximum distance, as set forth above in steps a)-f). Another node could potentially spoof its velocity, by intentionally shifting the center frequency of the responding PONG, however, this spoof will become immediately apparent to the network as a whole in the proceeding steps of this method, as it would only be able to spoof its velocity for a single node.

i) In a third step, each node may transmit an RF signal that is receivable by its local nodes ("ECHO" signal). The ECHO signal contains identifying information for the subject node, the lightsphere information for the subject's local nodes as determined by the subject node, and additionally it contains the observed doppler shift either in units of frequency or converted to a velocity by using the doppler equation and the speed of light in a vacuum. Each node carries out this same process, so that each of the local nodes receives ECHO signals from the other local nodes. Thus, each of the local nodes knows 1) its own location; 2) the maximum distance from it to the other local nodes; 3) the maximum distance from each of the other local nodes to each other local node; and 4) the relative velocities of nodes to one another as measured by the doppler shift method.

j) In a fourth step, computational techniques are applied by each node (which computation may occur onboard or offboard the node, which would be the case, for example, in which the nodes have limited available processing power and are adapted to use off-board processors to perform data processing) to determine the relative velocities of the other local nodes. Specifically, the computational technique would first use the observed doppler shift via a Fast Fourier Transform (FFT), or other method), comparing the center frequency of the PING and the PONG. If such the geospatial relative velocity of a local node is determined withing a pre-determined margin of error, that local node may be deemed "validated". The node will then write the location of the validated local nodes (but, in embodiments, not its own geospatial location) to the blockchain.

k) Steps g)-j) may then be repeated over time, with the result that a time history of verified geospatial velocity information for each validated node is written to the blockchain.

The algorithms for determining whether a node is authentic may be tailored to the specific operating goals of a specific blockchain. For example, in an exemplary, non-limiting application, it may be a rule that a node will lose validated status if its geospatial location has not been written to the blockchain for a period of X minutes. In another example, it may be an application-specific blockchain rule that a node will lose validated status if its geospatial location has changed by greater than a threshold amount in a given period of time. In another example, the application specific blockchain rule may require a node's position to be verified both with a computational positioning technique of light sphere delays from multiple nodes and additionally a state velocity vector of a node to be measured by the doppler shift method described in above. For example, the doppler shift measured of a node should agree with the expected position and relative velocities of each node in the network. In another application specific blockchain rule may require a node's position to be measured over time to compute an average velocity vector and that velocity vector must agree with a doppler shift measured velocity within a specified acceptable tolerance. In yet another example, a node may be challenged to perform a physical maneuver that results in a change of its velocity and/or direction of travel which, when the node complies, may be verified by the geospatial information written to the blockchain for that node (this could be termed an "acceleration challenge"). And so on, with no limit to the number of ways that node geospatial location information can be used to validate the nodes of the network, or to manage network operations, usually via a set of blockchain operating rules that form a part of the blockchain operating instructions stored in each nodes local memory, or, in some cases, off-board memory, and executed by the controller(s) or processor(s) in each node The nodes participating in the PoL or PoLV method of the invention may be rewarded by receiving value for the work they perform carrying out the PING-PONG signaling, ECHO signaling, and processing required to carry out the method steps of the invention. In embodiments, the value reward may be in the form of a currency such as a cryptocurrency. Nodes that are sending the PING, receiving the PONG signal, processing the round-trip delay and calculating lightspheres, sending the ECHO signal, receiving the ECHO signal from other local nodes, performing computational methods to determine the geospatial location of the other local nodes, and writing the geospatial location of the other local nodes to the blockchain may be termed "validating nodes".

Nodes may be space-based, airborne, or ground-based, in any number and in any combination. The scope and breadth of the invention is not limited by the geospatial location of the nodes: they may be located anywhere, as long as they are in RF communication with at least one local node.

It is a feature and benefit of the system and method of the invention that nodes are able to reach consensus regarding the location of other local nodes without the requirement that the nodes have synchronized time references. The ability of the system and method of the invention to operate its location-finding algorithm without any need for synchronized time information between nodes is an important feature and advantage of the system. Other well-known RF-based position-determining systems such as Global Navigation Satellite Systems (GNSS) used for location-finding, may be, for example the Global Positioning System (GPS), the GLObalnaya NAvigatsionnaya Sputnikovaya Sistema (GLONASS), Galileo and BeiDou all rely upon synchronized time information at each node in order to determine a node's location. In contrast, the nodes of the present inventive system and method determine the location of other local nodes by observing the round-trip time for a radio signal to reach such local nodes and to be returned (i.e., "reflected") by such other local nodes (sometimes referred to as "peer nodes") in the system. From this measurement of round-trip delay, using the methods described herein, nodes in the system are able to determine the geometry of three-dimensional 3D spherical regions ("lightspheres"), having an origin at the validating node, within which the other local nodes must be located, given that the speed of light (c) may be assumed, for purposes of the algorithms of the invention, to be a constant for the travel of the PING and PONG RF signals between the nodes.

Finally, by way of all the local validating nodes sharing the lightspheres, and optionally sharing measured doppler shifts, they determine for other local nodes of the blockchain network with whom they have communicated by radio, they are able to verify (or not) the location of the other local nodes using the shared lightsphere information and doppler shift information, meaning that when a local node uses computational techniques to determine the geospatial position and velocity of other local nodes, a consensus on the location and velocity of the local nodes has been reached by virtue of the fact that the determination of location is performed using measured location information from the other nodes. Thus, a local node may write its determined geospatial location for each local node to the blockchain with certainty that its determined location for those local nodes, which have become validated nodes, is consistent with the measured location and velocity information from the other nodes.

A novel feature of the system and method of the invention is that nodes may pay a fee to participate in the blockchain, in some embodiments in the form of tokens (termed here "SpaceCoin" tokens for convenience), to have their location proven and recorded into permanent blockchain history by simply transmitting their reflected signals (these are PONG signals) to any nodes within radio range. An exemplary, non-limiting blockchain network built upon the inventive methods and features described herein, comprising a plurality of nodes in radio communication with one or more other nodes of the system, that provides rewards using a cryptocurrency termed SpaceCoin, may be termed a "SpaceCoin network".

In embodiments, the invention may optionally comprise a method for determining the authenticity of a proposing node in a blockchain network comprising one or more validating node(s) by determining the geospatial relative velocity of the proposing node, by measuring the doppler effect shift of a PONG from the proposing node, the method comprising the steps of:
   a. determining, by each node, its own geospatial position and velocity vector in a three-dimensional frame of reference;
   b. determining, by each of the one or more validating node(s), the relative velocity to the proposing node that is within radio communication range using a PING-PONG approach;
   c. determining, by each node, a maximum distance to the proposing node that are within radio communication range, with no additional information or radio broadcasts other than the PING-PONG method;
   d. transmitting, by each validating node, an RF signal that is receivable by its local nodes, wherein the RF signal is an Echo also containing velocity information for the proposing node;
   e. applying computational techniques onboard or offboard each validating node to determine the geospation position and relative velocity of the proposing node;
   f. declaring the proposing node as validated in the case in which the proposing node's geospatial position and velocity are within a pre-determined margin of error;
   g. repeating, steps a.-f. over time, with the result that a time history of verified geospatial velocity information for each validated node is written to the blockchain.

BRIEF DESCRIPTION OF THE DRAWINGS

The accompanying drawings, which are incorporated into and form a part of the specification, illustrate one or more embodiments of the present invention and, together with the description, serve to explain the principles of the invention. The drawings are only for the purpose of illustrating exemplary embodiments of the invention and are not to be construed as limiting the invention. In the drawings.

Figure 1:
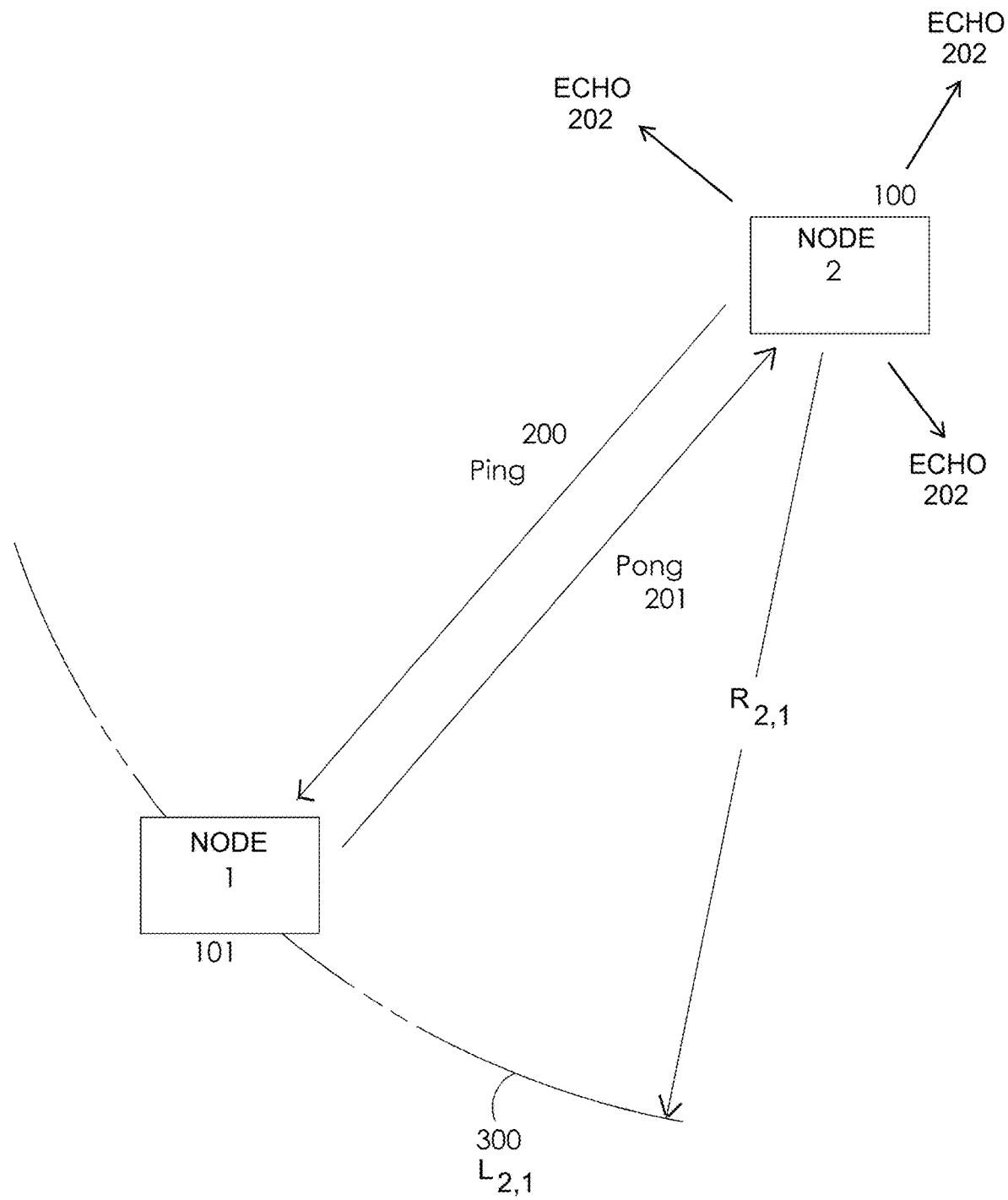
FIG. 1 depicts two nodes of a network of the system, showing the PING and PONG signals, and defining the lightsphere to be determined by the PINGing node.

In the figures of the drawings, like item callouts, or reference numbers, refer to like features.

DETAILED DESCRIPTION OF THE INVENTION

The following documentation provides a detailed description of the invention.

Although a detailed description as provided in this application contains many specifics for the purposes of illustration, anyone of ordinary skill in the art will appreciate that many variations and alterations to the following details are within the scope of the invention. Accordingly, the following preferred embodiments of the invention are set forth without any loss of generality to, and without imposing limitations upon, the claimed invention. Thus, the scope of the invention should be determined by the appended claims and all their legal equivalents, and not merely by the preferred examples or embodiments shown and described herein.

As used herein, "consensus mechanism" means a method used to validate a node of a blockchain network that desires to perform operations on the blockchain. For example, such operations may be to write blocks of data a distributed blockchain ledger. The present system and method of the invention provide a consensus mechanism that operates on proving location of such nodes called "Proof of Location", or PoL.

As used herein, "node" means an apparatus, device or other structure that is able to carry out the functions attributed to nodes defined herein. A node may comprise at least one transceiver in communication with at least one antenna, which may be an antenna array; a processor or controller in communication with the transceiver; a node time base, oscillator, or other reference, in communication with the processor or controller; at least one non-transitory computer-readable medium (i.e. "memory") for storing instructions that when read and executed by the processor or controller, causes the processor or controller to carry out the steps of the invention, wherein the memory is in communication with the controller or processor; and a power supply or connection to a power supply that is in communication with at least the processor or controller, the memory, the node time base, and the transceiver. A node may be located at any geospatial location; for example, a node may be located on the surface of the earth, airborne above the earth's surface, in orbit around the earth, in deep space, on the surface of any other celestial body, or at any other geospatial location. Nodes of the system communicate with other nodes of the system that are within radio communication range, using radio frequency (RF) communications means. Each node may have knowledge of its own geospatial position. A "proposing node" is a node on the blockchain network that seeks to be validated. A "validating node" is a node that participates in the PoL consensus system and method of the invention. All nodes of the blockchain network are in data communication with one another via wireless or wired networking means, such as system of wireless transceivers and gateway servers, such that all nodes of the blockchain network are in data communication for purposes of blockchain data communication (for example, adding blocks of data to be added to the distributed blockchain ledger, receiving blocks of data that have been added to the distributed blockchain ledger, receiving messages for the management of the blockchain network, and so on). In embodiments, all nodes of the network, also are in radio communication with at least one or more of the other nodes of the network via RF communication means to carry out the PING/PONG/ECHO PoL signal operation as described herein for purpose of implementing the inventive consensus mechanism. Each node of the blockchain network has a unique node name.

As used herein, "local nodes" means nodes of the network that are in direct RF communication with one another for purposes of carrying out the PING/PONG/ECHO and node validating (i.e. authenticating) steps of the invention.

As used herein, "geospatial position", "geospatial location", "position" and "location" mean the location of an object in a three-dimensional space defined by a coordinate system that uniquely defines all points in the three-dimensional space.

As used herein, "SpaceCoin" may refer to the inventive system, methods, and inventive features, elements and principles presented herein.

Figure 3:
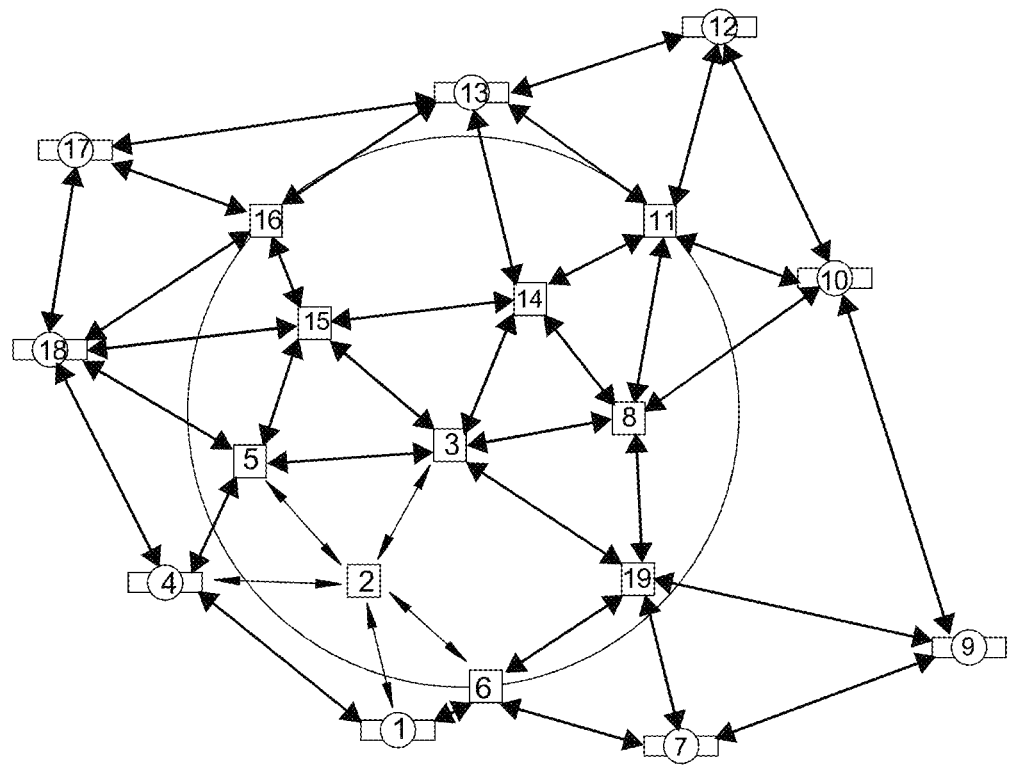
FIG. 3 depicts a view of the earth with a system of terrestrial nodes and spaceborne nodes in communication, each node in communication with one or more other nodes of the system for purposes of the radio location consensus mechanism operation, and all nodes in communication with one another for purposes of blockchain communication.

Referring now to FIG. 1, two nodes, Node 1 101 and Node 2 100 of a system of the invention 001 are depicted for explanatory purposes regarding the manner in which one node determines the distance to another node of the system. Node 1 and Node 2 may be in communication via one or more Radio Frequency (RF) communication link(s), which may be bidirectional, as depicted by arrows 200 and 201, and as depicted in FIG. 3.

In this simple example, which is but one of numerous examples of the schema of the invention, Node 1 (a "proposing node", in this case, that desires to become validated (i.e. authenticated) so it can write data into a blockchain) 101 will prove its geospatial location to the other nodes in the network. The process will actually begin with any of the other nodes other than Node 1 that is in radio communication with Node 1. For example, the system operation may be described by referring now to Node 2 (operating as a "validating node") 100 as follows. Node 2 will generate and transmit a PING RF signal on RF link 200 that may be, in embodiments, but is not necessarily, broadcast omnidirectionally (i.e. in all directions) on a pre-determined frequency that is agreed upon in advance, by any process desired. This PING signal need only contain the following information: Node 2's unique name (in this case, for example, "Node 2"), and an unpredictable Universally Unique IDentifier (UUID) specific to Node 2 that Node 2 randomly generates via an algorithm that is difficult or impossible for others to guess what UUID will be generated next. Node 2 will store this UUID in its memory, and at the exact instant that Node 2 broadcasts its PING signal, it will read the current time as measured by its own internal time base/local oscillator, and also store the PING transmit time in its local memory and relate it to the UUID for that particular PING signal transmission. There is no requirement that Node 2's local time base/local oscillator be synchronized with any other oscillator or time source of any node in the blockchain network, although, in embodiments, it may be.

In alternative embodiments, Node 2 may also record its PING signal transmission time by sending an encrypted timestamp in its PING signal, the encryption having a private key that only Node 2 knows (i.e. this private key may be stored in Node 2's memory, but may be unknown to the other nodes of the system).

In further alternative embodiments, an even more secure means of verifying the timestamp of a PONG's transmission is a synthetic implementation of both sending an unpredictable UUID, and also encrypting that unpredictable UUID with a private key known only to Node 2. In embodiments, no other nodes in the blockchain, participants, or observers, need to know, should know, or are able to know the time at which Node 2 broadcast's its PING signal, according to Node 2's local time base, except Node 2. In effect, this arrangement removes the requirement of the nodes of the system to utilize a synchronized, trusted source of absolute time. Node 2 will then broadcast this beacon, which may be, in embodiments, transmitted omnidirectionally (in all directions).

Still referring to FIG. 1, Node 1, being a finite distance from Node 2, will receive Node 2's PING that has propagated at a known signal velocity based on the speed of light in a vacuum as may be modified by the signal environment. Node 1 will then 1) modify the received PING signal by adding Node 1's unique name; and 2) will transmit the modified signal back to Node 2 as Node 1's PONG signal. The PONG signal transmitted by Node 1 on RF communication link 201 will comprise Node 2's unique name, Node 2's UUID (which may, in embodiments, be encrypted), an optional encrypted timestamp from Node 2 (the time Node 2 transmitted the PING signal) if present, and Node 1's unique name that was added to the PING signal by Node 1 to create the PONG signal. Node 1 will then broadcast this PONG signal either omnidirectionally or otherwise, but in any event in the direction of Node 2 such that the PONG signal transmitted by Node 1 is able to be received by Node 2. Node 1 and Node 2 are thus in RF communication for both the PING and PONG signals. The PONG signal may be, but is not necessarily, transmitted by Node 1 on the same agreed upon frequency used by Node 2 to transmit the PING signal.

In embodiments, any of the RF transmissions of the system may utilize any form of modulation, may use any frequency band or combination of frequency bands, and may utilize any other form of encoding or decoding in order to provide secure communications. For example, embodiments of system implementations comprise direct spread spectrum signaling techniques or frequency hopping, as but a few examples.

Once Node 2 receives the PONG from Node 1, it can identify and record the time at which the original PING signal was sent using the UUID in the received PONG signal to look up the time at which the original PING signal was sent, which was stored in Node 2's local memory; or by decrypting the timestamp, if the timestamp was embedded in the PING signal, which was returned in Node 1's PONG signal; or by decrypting the UUID, in the PONG that references the originating PING transmit time in its memory, and compare the PONG receive time to the PING transmit time, to determine the round trip delay time (the time it took the PING signal to travel from Node 2 to Node 1 back to Node 2). In embodiments in which Node 2 has encrypted the timestamp and embedded it in its PING signal, Node 2's ability to read the encrypted timestamp from the received PONG signal also proves that Node 2 originated the contents of the message, as opposed to another node or radio station attempting to spoof Node 2 to itself. Once Node 2 has confirmed that it can read the timestamp, the PONG may be termed a VERIFIED PONG.

By comparing the time at which Node 2 received the PONG to the time Node 2 transmitted its PING, Node 2 can determine the round-trip PING-PONG signal propagation time; and knowing the round trip PING-PONG signal propagation time, and using the known propagation velocity of the PING-PONG signals, Node 2 can determine the length of the path $R_{2,1}$. In other words, a maximum distance of Node 1 (the proposing node) from Node 2 (the validating node) may be calculated by Node 2 by dividing the known propagation velocity of the PING-PONG signals by half of the round trip time, thus establishing a maximum distance from Node 2 to Node 1, which essentially determines the maximum radius of a sphere, centered at Node 2's geospatial location, within which Node 1 is located. This sphere may be termed a "lightsphere". The Node 2 lightsphere for Node 1, then, is centered at the Node 2's geospatial location, and has a radius $R_{2,1}$ equal to the maximum distance from said Node 2 to Node 1. Optionally and additionally, in embodiments, Node 2 can also measure the doppler shift of the difference between the expected frequency of the PONG, and the actual received frequency of the PONG from Node 1. This can be done by Fast Fourier Transform (FFT), or any other comparative frequency algorithm, with reference to a clock source on Node 1, such as a crystal or atomic oscillator. When the doppler shift is measured by Node 1, then Node 1 can know both the maximum distance and the relative velocity of Node 2.

It is possible that Node 1 is unreliable, and as such should not be validated: for instance, in the case in which Node 1 experiences a malfunction resulting in an unintentional delay in transmitting its PONG signal; or, in the case in which Node 1 maliciously delayed sending its PONG signal (in the case, for example, in which Node 1's operator is a bad actor). Or perhaps a bad actor attempting to pose as Node 1 has transmitted a spoof signal from a location other than Node 1's true location. If Node 1 is trustworthy, it will very likely send its PONG signal without delay, meaning that Node 1 very likely is positioned on the surface of, or within the volume of, a light sphere $L_{2,1}$ that is defined as a sphere in three dimensional space that has its origin located at the geospatial location of Node 2, with its radius $R_{2,1}$ defined as half of the total PING-PONG path length determined by multiplying the known propagation velocity of the PING-PONG signals by the difference in the time at which Node 2 received Node 1's PONG and the time at which NODE 2 transmitted its PING. Regardless of Node 1's precise whereabouts within the measured lightsphere $L_{2,1}$, Node 2 has a physically-measured guarantee that Node 1 is located somewhere within the light sphere $L_{2,1}$. It would be impossible for Node 1 to exist outside the light sphere $L_{2,1}$, considering that only Node 2 knows when it sent its PING, and given that Node 1 cannot send a responding PONG faster than the speed of light.

In another example of Node 1 acting as a bad actor, it intentionally shifts its PONG frequency to spoof an inaccurate doppler velocity to Node 1. This intentional and nefarious shift in PONG frequency by Node 1 will also be measured by other nodes in the network, and resulting (incorrect) doppler shift relative velocities will be measured by these other nodes. Ultimately, either by a subsequent set of PING-PONGS at a future time, or by comparison of these incorrect measured velocities in the subsequent "ECHO" step described below, it will be obvious that the measured doppler shift velocities in any and all possible directions, are not aligned with the measured positions over time via the lightsphere method. Thus, any application on the blockchain will be able to detect this "doppler spoofing" of Node 1, and can proceed accordingly to the rules of that application.

Finally, Node 2 will share this measured location and size (e.g. determined radius which is equal to the distance between Node 2 and Node 1, or $R_{2,1}$) of lightsphere $L_{2,1}$ 300 with other local nodes. This final type of radio signal transmitted by Node 2, which contains Node 2's determined location and size of light sphere $L_{2,1}$ may be termed an ECHO signal. Node 2 may, in embodiments, broadcast this ECHO signal as an RF signal in all directions as RF communication 202 (i.e. omnidirectionally) and will include at least its unique node name (in this case, Node 2), the reported name of the node that responded with a PONG or VERIFIED PONG (in this example, Node 1), as well as the location and size of light sphere $L_{2,1}$ as determined by Node 2. Additionally and optionally, Node 2 can also share in its ECHO, the measured doppler shift in units of frequency and/or converted to units of velocity using the doppler equation and the speed of light in a vacuum.

Essentially, Node 2's ECHO message will communicate: "I am Node 2, I measured Node 1 to be within $R_{2,1}$ (kilometers/meters/miles) distance from my current location at this instant in time." Additionally and optionally, Node 2's ECHO message will communicate: "I am Node 2, I measured Node 1 to be within R2,1 (kilometers/meters/miles) distance from my current location, and at a relative velocity of V1 (meters/sec or feet/sec) at this instant in time."

Figure 2:
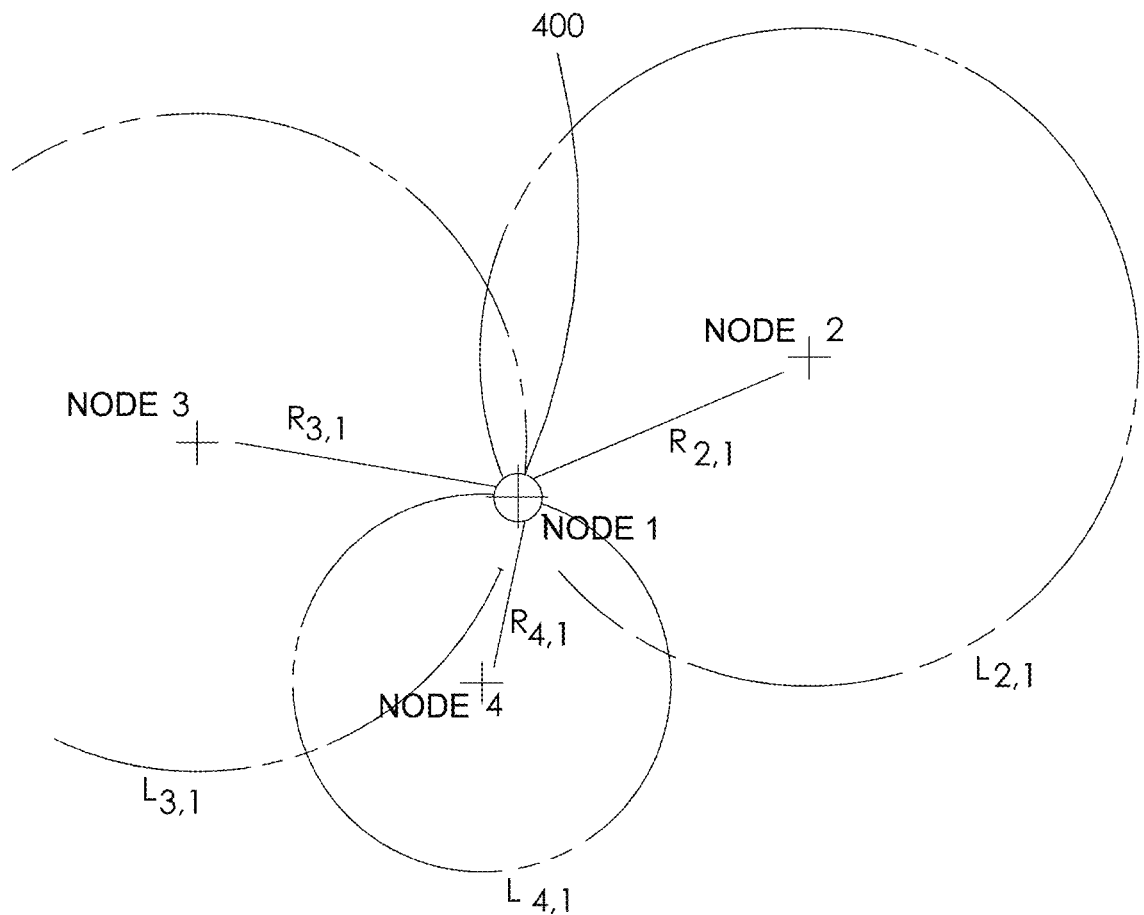
FIG. 2 depicts four nodes of a network of the system, showing the lightspheres determined by three PINGing nodes (i.e., validating nodes) for determining the location (i.e. geospatial position) of the fourth node proposing to add a block of data to the distributed blockchain ledger, which is a PONGing node, and depicting a spherical volume representing the possible error of the determined location of the fourth node.
Figure 4:
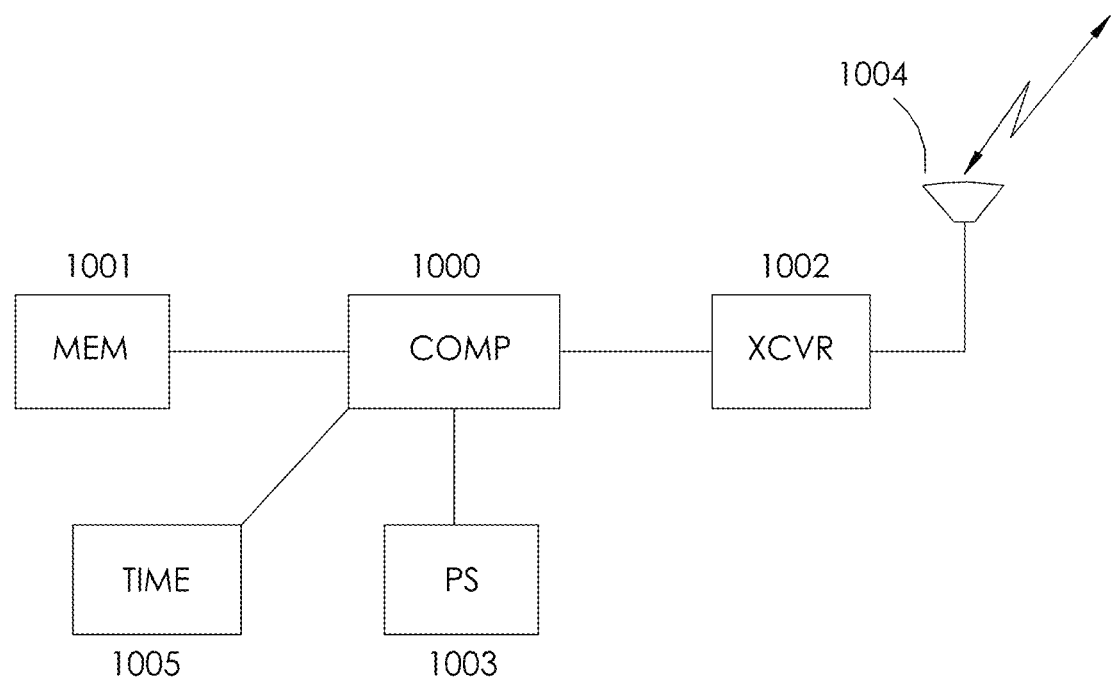
FIG. 4 depicts an exemplary node architecture.

Referring now to FIG. 2, an exemplary embodiment of a system of the invention comprising four nodes (Node 1, Node 2, Node 3 and Node 4) is depicted. Each of the four nodes may be, but are not necessarily, identical, except for each of them having a unique name (NODE NAME) they present to the other nodes of the system. A basic, exemplary, non-limiting node architecture is shown in FIG. 4.

Still referring to FIG. 2, four nodes of an exemplary embodiment of the inventive system and method of the invention, which, for naming purposes, may herein be referred as the "SpaceCoin network", are depicted for further explanatory purposes. The four nodes may be named Node 1, Node 2, Node 3, and Node 4. Some of the nodes may be operating in vacuum, in a freefall (unaccelerated) reference frame, void of any other objects or celestial bodies. Of course, the system and method of the invention also works in any real-world scenario, comprising a plurality of nodes in an any geospatial orientation, configuration or location, and may therefore, in embodiments, comprise one or more node(s) in Low Earth Orbit (LEO) or any orbit, one or more node(s) on the surface of the earth, one or more node(s) in cis-lunar or lunar orbit, and one or more nodes in any combination of the foregoing, and in any number.

Still referring to FIG. 2, as discussed above relative to Nodes 1 and 2, Node 2 has been able to determine the location and radius of light sphere $L_{2,1}$ and Node 2 has broadcast an ECHO message to at least some of the other nodes of the system indicating its node name (Node 2), the reported name of the node that responded with a PONG signal (in this example, Node 1), and the location and size of light sphere $L_{2,1}$. Likewise, the other nodes 3 and 4 have determined lightspheres for Node 1 $L_{3,1}$ and $L_{4,1}$ Meanwhile, all other nodes within the network will have been sending their own PINGs, and responding with their own PONGs, and finally, sending their own ECHOs of measured light spheres regarding the other nodes of the system, after verifying the PONGS. Node 2 will then, in this example, receive reported measured lightspheres $L_{3,1}$ and $L_{4,1}$ indicating where the other two nodes (Node 3 and Node 4), measured Node 1 400 to be in terms of distance from themselves according to their own PONGs, which may be, in embodiments, VERIFIED PONGS.

This process of PINGs, PONGs, optional VERIFIED PONGs, and ECHOs, between all nodes, may continue at arbitrary (or determined) persistent and/or continuous intervals, so that all nodes can determine the positions of their peer nodes and continually prove their own positions. After a given node has measured sufficient positions of a peer node over an interval of time as measured by its own local time reference (which may comprise a precision oscillator) such as 1005 as shown in FIG. 4, it can calculate a state vector and deduce spatial and kinetic properties of all nodes in the network, such as velocity, position, and orbital parameters. Thus, if a node cares to do so, it can both further confirm accurate and truthful position reporting by ensuring a peer node's trajectory is as predicted or within reasonable physical capability of a space vehicle as it travels and continues to prove its location, and it can detect when other nodes have changed their state vector, for example, by performing an accelerating maneuver (delta-V maneuver).

As a means of even further verification of a peer node's position, one node may request an "acceleration challenge" of another node. All nodes can optionally advertise additional capabilities they have, above and beyond the minimum requirements of a computer, a clock, and a radio. This advertising may be achieved by embedding fields of data in the aforementioned radio transmissions. For example, a node can advertise if it has computer, storage, or data transmission capabilities, a reaction control system, or controllable propulsion system. If a node advertises a means of propulsion control to other nodes, then its peers can optionally request the acceleration challenge. The node has the option to accept or not, given that fuel is a finite and often non-replenishable resource for many space vehicles. If it accepts, it can then perform the requested acceleration maneuver. This acceleration challenge can offer a means of elevated trust (perhaps for a reward of additional tokens), or it can offer a means of a distant node on the physical edge of an expanding SpaceCoin network and out of radio range of sufficient nodes to prove its location with PONGs from an unaccelerated station.

Therefore, Node 2 will receive a continual stream of data of the measured light spheres within which Node 1 must reside. Node 2 can then store this measured location information and use computational techniques to determine the geospatial location ("validated geospatial location") of Node 1. The computational techniques may comprise a wide variety of numerical methods by minimizing the error of an intersection of all measured light spheres. Node 2 may then write the validated geospatial location of Node 1 in the next block of the SpaceCoin blockchain.

Likewise, all validating nodes may do the same for each local node with which they are in RF communication. And so on. In this manner the blockchain may record a running time history of validated (consensus based) geospatial location information for all the nodes of the system.

In embodiments, the rules for a particular blockchain may specify that no node may be validated unless a minimum number m of validating nodes have reported lightspheres for that node. This essentially means that, for that particular blockchain application, the consensus method must be based on at least m validating nodes providing lightsphere information for that node. If, for example, m were to equal 4, any node attempting to validate a local node would need to have received lightsphere information from the ECHO signals of at least three (3) other local nodes for that node. If there were not at least three other local nodes providing lightsphere information for that node, the validating node would not be able to determine a validated geospatial location for that node per the blockchain rules for that application. The number of lightspheres m required for consensus may be determined by the system designer based on any number of system parameters and desired results as may be determined by the physical implementation and configuration of the system, system-specific need for higher or lower levels of security, reliability of radio communications in the presence of conditions that may limit communication range or affect bit error rate, such as solar flare degradation of space-based transceivers, and other system and environmental parameters. The minimum number of required validating confirmations m required may thus be variable over time in a particular application.

Just as is the case in existing blockchains such as Bitcoin, which leverages Proof of Work (PoW) consensus, each validating node of the system continually invests resources to have an opportunity to vote on the truthfulness of data to be recorded in the permanent ledger ("subject ledger data"). Additionally, there exists other opportunities to provide value to the SpaceCoin network that may require a material investment for ground nodes such as providing high data rate network connectivity to terrestrial resources, or providing access to lower-cost terrestrial computers, in addition to, for example and not by way of limitation, also determining the positions of orbital nodes that fly overhead. Thus, nodes of the system may participate in the operation of the system, using their own resources, and thus may be rewarded by a transfer of value to such nodes (for example, the aforementioned SpaceCoin cryptocurrency).

In embodiments, the consensus mechanism of the invention may be parameterized by an approximation (or error) value, "\e", which defines the maximum distance from a proposing node's true location in any direction that is a valid representation of that node's distance, such that if any validating node believes that the proposing node is x kilometers away from the validating node, the distance x is considered "true" so long as the proposing node's actual distance from the validating node is no more than x+\−\e kilometers.

In embodiments, a maximum PING-PONG signal round-trip time may be set by a validating node. Any PONG signals received after the maximum PING-PONG signal round-trip time will not be accepted by the validating node that transmitted the PING.

Referring now to FIG. 3, an exemplary, one-of-many, embodiment of a network of the invention is depicted. In this example, which is merely illustrative and not limiting, the blockchain network is depicted as comprising both space and ground-based nodes. Node 2 is seen as communicating with local nodes 1, 3, 4, 5, and 6 for purposes of Node 1 operating as a validating node that is carrying out the location validation steps of the invention. However, it is understood that the blockchain network, comprising a plurality of nodes such as nodes 1-19, may be completely space-based, completely terrestrial on any terrestrial body (i.e. any planet or other body), or any mix or combination of the foregoing. Because Node 2 is not in RF communication with the other nodes 7-19, the other nodes 7-19 are not local nodes to Node 2, and thus Node 2 would not be able to validate the position of those nodes. In other words, in this example, Node 2's local group, for which it can carry the location validating steps of the invention, consists of Nodes 1, 3, 4, 5, and 6. However all nodes of the blockchain network 1-19 are in data communication via the blockchain communication servers, various data links such as for example wireless links such as RF links or optical links, wired data links and networks which are not depicted in FIG. 3 for clarity, such that each node 1-19 is in communication with the other nodes of the blockchain network. These blockchain connections are understood and are not depicted in FIG. 3 for clarity purposes, and may be referred to herein as the blockchain network, useful for communication of blockchain information to the nodes of the blockchain system.

Referring now to FIG. 4, and exemplary node architecture is depicted. The nodes of the system and method may comprise at least one computer, controller or processor 1000, at least one radio (e.g. a transceiver XCVR 1002 in communication with at least one antenna 1004) in communication with the computer, controller or processor 1000, and a local time source 1005 comprising a timing device, which may be, in embodiments, a precision timing device, such as a rubidium atomic clock or other high-precision oscillator, that is also in communication with the computer, controller or processor 1000. Computer 1000 may be in communication with non-transitory computer readable and writeable media (i.e. memory) 1001 for storing and reading computer-executable instructions to carry out the steps and functions of the invention. The at least one transceiver 1002 may be a plurality of transceivers for communicating local nodes via RF links and for communicating with the blockchain network for communication of blockchain information. This basic, exemplary node architecture is shown in FIG. 4. All components of the node may be in communication with a source of electric power, which may be any battery, photovoltaic system, electric power grid or other source of electric power 1003. In general, nodes of the blockchain system may be implemented using a wide variety of hardware, providing the hardware affords the node the following components, functions and/or capabilities:

LOCAL TIME SOURCE/OSCILLATOR. Precision time measurement of delay between the onboard radio sending a signal (PING), and receiving the matching response (PONGs) from other nodes on the blockchain network. Exemplary, non-limiting local time sources/oscillators are electrodynamic oscillators that oscillate the resonant amplitude of an input voltage at a precise frequency. These amplitude oscillations can be measured by the onboard computer as a means of measuring the passage of time within the inertial reference frame of the node. For example, and not by way of limitation, a quartz crystal oscillator manufactured to typical commercial aerospace tolerances, may be utilized for this purpose, and generally offers frequency within ±0.5 ppm, which translates to a precision better than 1 kilometer, and at best, within 5 meters. Other, more precise means of measuring time may also be used, such as atomic oscillators including but not limited to rubidium or cesium oscillators.

RADIOS. The nodes of the system may include one or more radios comprising radio frequency (RF) transceivers 1002 in communication with a local computer 1000 on the one hand, and in communication with at least one antenna 1004 adapted to radiate and receive radio frequency (RF) electromagnetic energy at the operating RF frequency bands of the system, in any desired pattern, including but not limited to radiating isotropically, on the other hand. In certain spaceborne nodes, for example, the radios may operate in the Ultra High Frequency (UHF) and/or S-Band radio frequency bands, either of which may be used for the sending and receiving of PINGs, PONGs, and ECHOs, between other ground and space nodes in the network. However it is to be understood that the system and method of the invention may comprise any RF frequency band and modulation scheme, and while certain RF frequency bands may be mentioned in this disclosure, these are identified for convenience and only for describing the operation of the system on an exemplary basis, and are not to be construed as limiting the scope of the description of the invention, or the appended claims.

COMPUTER. The nodes of the system and method may require at least one computer 1000 comprising a processor or controller capable of executing computer readable and executable instructions, or software, which instructions may be programmed and compiled in any programming language or combination of programming languages such as, for example and not by way of limitation, C, C++, Rust, or binaries from other turing complete generic computer language, operating within a "real-time" Operating System, such as, for example FreeRTOS, or an operating system capable of executing instructions that have critical time constraints. The computer 1000 may also be in communication with, and provide programs access to, storage media such as random access memory (RAM) and non-volatile long-term storage media. Such non-transitory storage media may be onboard or remotely located, accessible via a communications link such as a radio communication link, and may be any known non-transitory media such as magnetic media, optical media, or any other type of media. The computer may comprise one or more processors or controllers in communication with the non-transitory storage media and the radios and transceivers of the node, the controllers and/or processors capable of executing the non-transitory computer readable and executable instructions stored in, and read from, the non-transitory media, in order to carry out the described features and steps of the invention and all functional equivalents.

Proof of Location (PoL) establishes the relative distance between two or more nodes that communicate via omnidirectional signals. Each node may have its own local (i.e, internal) time reference clock, which may be a high precision time reference (or clock), that is not assumed nor required to be synchronized, or in communication with, with any other time reference on the network, such as the local time references of the other nodes of the system. The local time references for the nodes do not need to be synchronized with one another for the RF range-finding function to operate.

Figure 5:
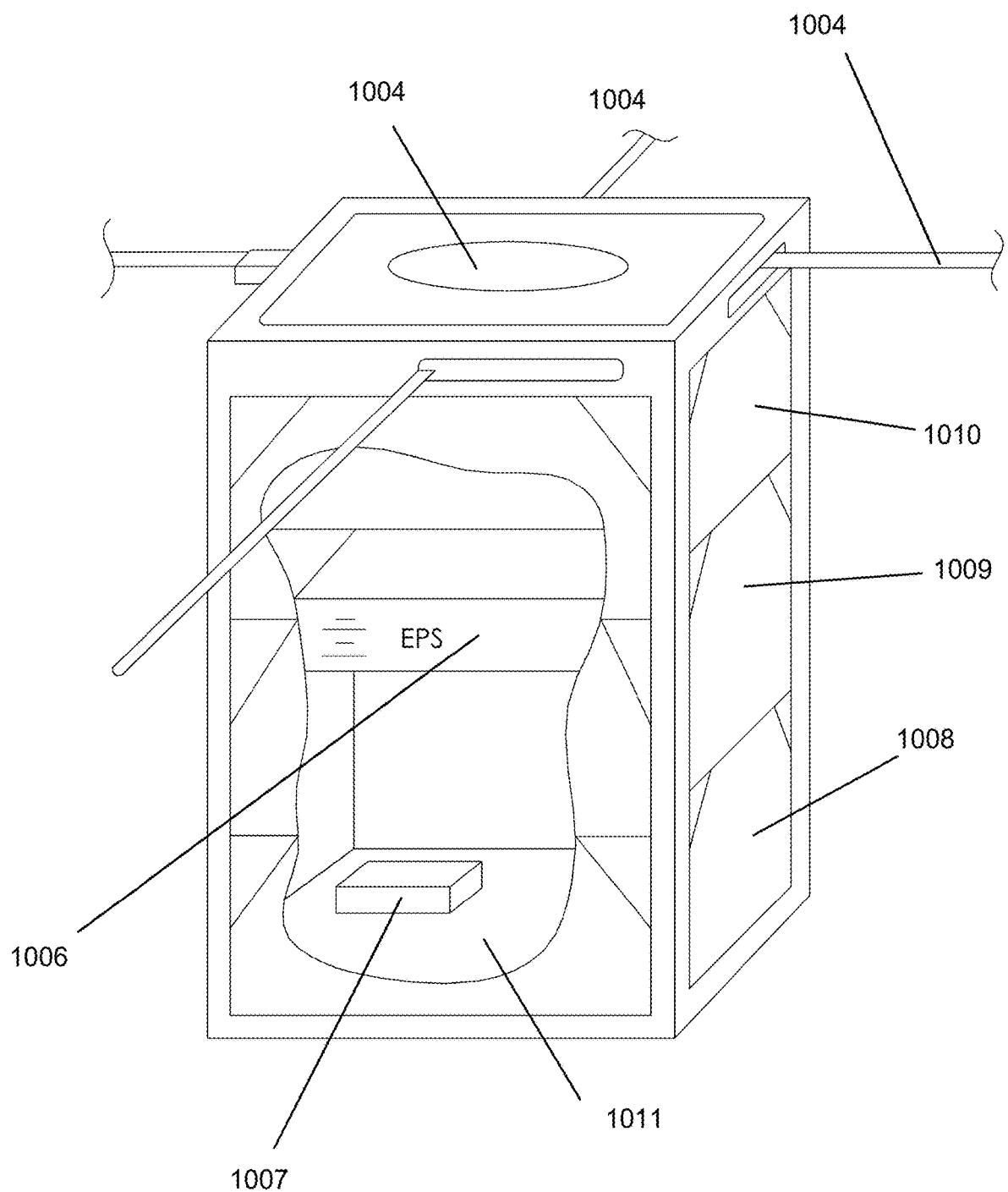
FIG. 5 depicts an exemplary embodiment (of many possible embodiments) of a small earth-orbiting satellite suitable for functioning as a node of the system and able to carry out the steps of the method of the invention.

Referring now to FIG. 5, an exemplary embodiment (of many possible embodiments) of a small earth-orbiting satellite suitable for functioning as a node of the system and able to carry out the steps of the method of the invention is depicted. The form factor of the satellite node may take any form factor, but may, in some embodiments be a cube satellite or other small satellite form factor. The satellite node may comprise a plurality of photovoltaic elements 1008, 1009, 1010 for providing electrical power to the satellite batteries directly to the elements of the system. Electric power system 1006 provides power conditioning, for example voltage regulation, and may be communication with the electronic elements of the system. The computer, memory, transceivers and other electronics 1007, 1011 may be housed within an interior volume of the satellite. The satellite may comprise any number of antennas 1004 for RF communications in the UHF, S-band, X-band, and other RF frequency bands.

Figure 6A:
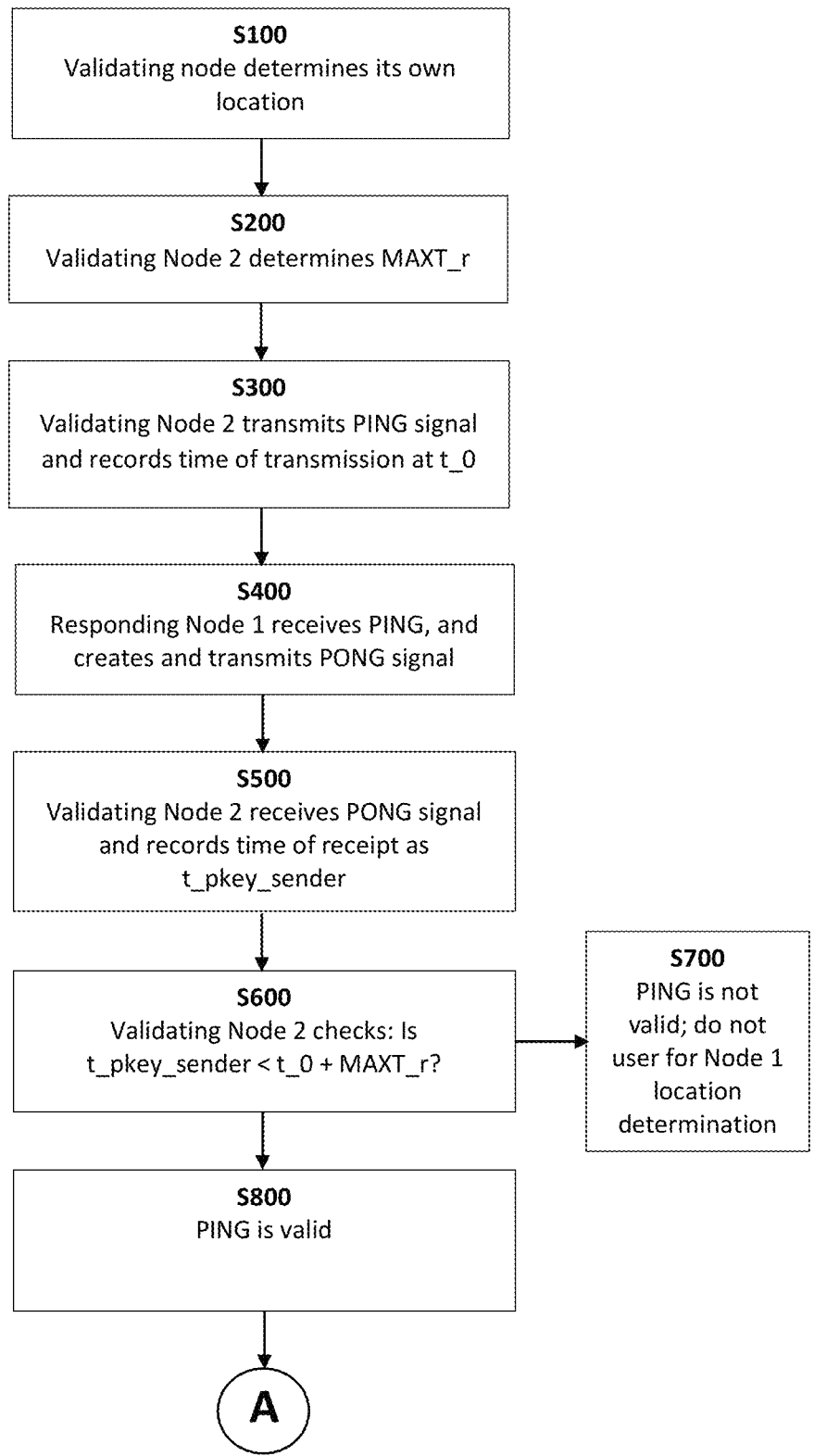
FIGS. 6A and 6B depict a flow diagram for an exemplary, non-limiting sequence of steps of an embodiment (of many possible embodiments) of the method of the invention.
Figure 6B:
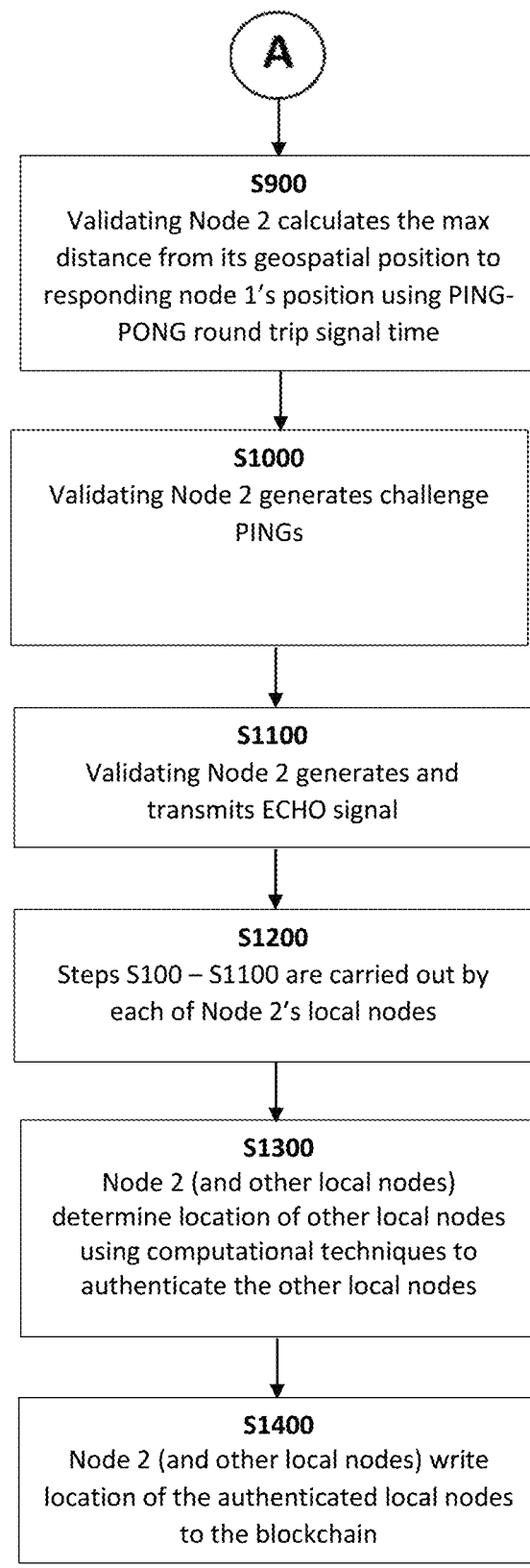

Referring now to FIGS. 6A and 6B, the steps of an exemplary embodiment of the method of the invention are described. In this example, Node 2 is a validating node working to determine a verified location of (responding or proposing) local Node 1.

1) Step S100. Validating Node 2 determines is own geospatial location in a three-dimensional frame of reference, using known systems and methods. For example, nodes may utilize satellite navigation systems such as GPS; they may use inertial navigation techniques to determine their location; they may receive location information from ground tracking systems, or they may use or any combination of these systems and methods, or other methods that are known in the art to determine their own geospatial position
2) Step S200. Validating Node 2 determines a maximum distance, indicated by a maximum PING-PONG signal round-trip time, for which it will accept any responses to its message. In embodiments, this delay, MAXT_r, may then be encrypted with Node 2's private key and subsequently hashed.
3) Step S300. Validating Node 2 transmits PING signal comprising Node 2's unique name (in this case, for example, "Node 2"), and a UUID, and logs its local time of PING signal transmission time as t_0.
4) Step S400. Node 1 (a responding or proposing node that desires to be validated) receives Node 1's PING signal, creates PONG signal by adding Node 1's unique name to the PING signal information, and transmits the PONG signal in such as way (i.e., in a direction and with sufficient power) so as to be receivable by Node 2.
5) Step S500. Validating Node 2 receives the Node 1's PONG signal, which includes Node 1's unique node name. Node 2 stores time of receipt of Node 1's PONG signal in Node 2's local memory, for example, as t_pkey_sender.
6) Step S600. Validating Node 2 checks if t_pkey_sender<t_0+MAXT_r (i.e., has too much time elapsed between the initial PING signal transmission by node 1 and receipt of the PONG at node 1?).
7) S700. If t_pkey_sender>t_0+MAXT_r, PING signal is not valid and cannot be used to determine responding Node 2's geospatial position.
8) S800. Ift_pkey_sender< or =t_0+MAXT_r, then Node 1's PONG is valid, and then:
    a) Step S900. Validating Node 2 calculates the max distance of Node 1 from Node 2 (which is based on the elapsed time between the initial PING and receipt of the PONG). This distance, which is the radius $R_{2,1}$ of lightsphere $L_{2,1}$ is at most MAXT_r. This value is stored in Node 2's local memory as, for example, d_0_nodeid.
    b) Step S1000. Validating Node 2 generates a pair of messages ("challenge PINGS"), whose MAXT_r values are:
    NOW+(t_pkey_sender-t_0)+\e+challenge_delay_duration
9) S1100. Validating Node 2 may then generate and transmit an ECHO signal comprising Node 2's unique node name (in this case, Node 2), the reported name of the node that responded with a PONG or VERIFIED PONG (in this example, Node 1), as well as the location and size of light sphere $L_{2,1}$ as determined by Node 2. This ECHO signal is transmitted in such a way as to be received by Node 2's local nodes.
10) S1200. Validating Node 2's local nodes also execute steps S100-S1100, and their ECHO signals are received by Node 2
11) S1300. From the information contained in these received ECHO signals, validating Node 2 possesses a plurality of lightspheres for each of its local nodes. Node 2 may then calculate a geospatial position of each of its local nodes using computational techniques. If the computation of position of any particular node does not fall within a predetermined range of error, that node is not validated.
12) S1400. Finally, Node 2 (and the other local nodes) adds its/their determined location for each validated node to the blockchain using the blockchain operating rules. These validated nodes may then write to the blockchain or perform other defined blockchain operations in accordance with the specific blockchain operating rules.

Economics and Applications

Given the resource investment required to observe locations of local nodes, offer terrestrial-space network connectivity, or offer computer or memory storage resources, a wide variety of economics (or tokenomics, in blockchain taxonomy) can be implemented that enable reaching Byzantine consensus. As a means of explanation by way of non-limiting examples, nodes may be rewarded "Space-Coin" tokens as a function of 1) how many other network fee-paying participants, or fee-earning nodes, for which they observe location (measured by, for example and not by way of limitation, how many ECHO signals they produce in a given blockchain block); 2) as a function of how much data a node exchanges between earth and space; or 3) by using computer resources to execute instructions or record or store block or state data. These are but a few examples of ways in which the system and method of the invention may be used to generate revenue for node operators and/or owners.

In addition to the inter-blockchain economics intrinsically present in the proposed proof and consensus mechanism partially enumerated above, the hardware and software required for SpaceCoin lends a number of intra-blockchain and real-world features that can be used to provide valuable services as a side-effect. For the purposes of explanation, one exemplary, non-limiting application includes offering a non-spoofable "Proof of Location" to end users in space or on earth. This service could be utilized, for example, as a validation mechanism for Multi-Factor Authentication (MFA) or for enabling hardware-stored private encryption keys that can only be used at a specific geographic location, which may be any location in a three-dimensional frame of reference. The specific geographic location may be further characterized by a volume of space surrounding the specific geographic location. The volume of space may be, in embodiments, spherical, having a center at the specific geographic location, and a radius that may be defined by the user. However, the volume of space may take any three-dimensional form of any shape, and may even be amorphous in shape, defined by the user or administrator of the system, in order to meet specific needs. Thus "Proof of Location" includes within its meaning determining that a node is within the volume of space surrounding the specific geographic location, where the volume is any defined volume, of any shape. The volume, in embodiments, need not be static, meaning that it may change shape and size over time in order to achieve faster consensus times at the expense of accuracy of location, such as when larger volumes of space surrounding the specific geographic location are defined; or alternatively, smaller volumes of space surrounding the specific geographic location may be defined that take longer to determine but result in more precise accuracy of location. Other system parameters may be played against the size and shape of the volumes of space surrounding the specific geographic location, such as for example, using larger volumes of space so that more distant nodes are able to participate in the PING-PONG signal exchange, allowing more nodes to participate in the consensus determination. This could be useful, for example, at the beginning of implementation of a system of the invention in which only a few nodes are operational. It is an aspect of the system that increasing the number of operational nodes of the system generally tends to reduce time to reach consensus, and enables a higher precision of determined positions of nodes in the system.

In embodiments, SpaceCoin nodes may also commercialize additional capabilities, and earn token rewards for those services, as first described in the previous section. For example, if a SpaceCoin node has sufficient radio bandwidth available, it can relay data from one location in earth or space to another, which in turn, can enable a form of decentralized telecommunication service accessible globally on earth, or in space. This service could be accessible in remote locations on earth once sufficient density of nodes are present in earth orbit, and can offer connectivity to terrestrial internet or relay data to other nodes. Furthermore, given sufficient node density and radio power, it can also offer the same routable telecommunication network for unmanned and manned space vehicles in deep space, or on the surfaces of celestial bodies other than earth in our star system.

Applications of the system and method of the invention may be sold or purchased in a decentralized economy built upon real-world physical infrastructure that requires significant engineering and aerospace investment. This capability, in-and-of-itself, is also a novel economic invention and advancement from all existing terrestrial and orbital telecommunication infrastructure that is purchased in a centralized, trusted, and private transaction.

What is claimed is:

1. A method for determining the authenticity of a proposing satellite node in a blockchain network comprising a plurality of satellite nodes, the method comprising the steps of:

determining, by each validating satellite node of a plurality of m validating satellite nodes, their own geospatial position;
determining, by each validating satellite nod, a lightsphere for said proposing satellite node;
communicating, by each validating satellite node to all other validating satellite nodes, the determined lightspheres;
determining, by each validating satellite node, a geospatial position for the proposing satellite node by performing computations on the lightsphere provided by the validating satellite nodes;
determining whether the determined geospatial positions of the proposing satellite node as determined by each validating satellite node agree within a predetermined margin of error;
declaring, by each validating satellite node, that the proposing satellite node is validated when the geospatial positions for the proposing satellite node fall within the predetermined margin of error and adding the proposing satellite node to the blockchain messages;
wherein the step of determining, by each validating satellite node, a lightsphere for said proposing satellite node, is further defined as comprising the steps of:
sending, from a first validating satellite node, a first validating satellite node PING signal;
receiving, by said proposing satellite node, said first validating satellite node PING signal;
transmitting, by said proposing satellite node, a first validating satellite node PONG signal in a direction and with sufficient power that said first validating satellite node PONG signal is receivable by said first validating satellite node;
transmitting, by said first validating satellite node, an ECHO signal, wherein said ECHO signal comprises at least the first validating satellite node unique node name, the unique node name of the proposing satellite node, and the radius the of the lightsphere for said proposing satellite node as determined by said first validating satellite node;
repeating, the steps of transmitting and receiving PING, PONG and ECHO signals, by the other validating satellite nodes of said plurality of m validating satellite nodes, wherein each ECHO signal is received by the m validating satellite nodes; and
determining a validated geospatial position of said proposing satellite node, by each validating satellite node, by using 1) each validating satellite node's knowledge of its own geospatial position, 2) the lightspheres for the proposing node as determined by each validating satellite node of said m validating satellite nodes, and 3) computational techniques for determining the geospatial position of said proposing satellite node.

2. The method of claim 1, further comprising the step of: for each proposing satellite node that is validated, writing that proposing satellite node's geospatial position to the distributed blockchain ledger.

3. The method of claim 1, wherein m is determined by a set of blockchain operating rules.

4. The method of claim 1, wherein the step of
sending, from a first validating node, a first validating node PING signal, is further defined as comprising: said first validating satellite node PING signal having a transmission time, wherein said first validating satellite node PING signal comprises at least a first validating satellite node unique node name and a Universally Unique IDentifier (UUID) specific to the first validating satellite node that the first validating satellite node randomly generates via a means that is difficult or impossible for other satellite nodes to guess the UUID to be generated; and further comprising the steps of:
a) storing said PING signal transmission time in said memory of said first validating satellite node;
b) modifying, by said proposing satellite node, said first validating satellite node PING signal by adding a unique node name for said proposing satellite node to the PING signal to create the first validating satellite node PONG signal;
c) receiving, by said first validating satellite node, said first validating satellite node PONG signal, at a PONG receive time;
d) determining a PING-PONG round trip time by subtracting said PING transmit time from said PONG receive time;
e) determining, at said first validating satellite node, a maximum distance of the proposing satellite node from the first validating satellite node by dividing the signal velocity by half of the round trip time, thus establishing a maximum distance from said first validating satellite node to said proposing satellite node, and further determining a first validating satellite node lightsphere for said proposing satellite node, wherein said first validating satellite node lightsphere for said proposing satellite node is centered at the first validating satellite node's geospatial position, and has a radius equal to said maximum distance from said first validating satellite node to said proposing satellite node.

5. The method of claim 1, wherein each of said m validating satellite nodes receives a reward.

6. The method of claim 4, wherein all signal transmissions are radio frequency (RF) radiated emissions.

7. The method of claim 4, wherein said PING signal transmissions are omnidirectional signals.

8. The method of claim 5, wherein said PONG signal transmissions are omnidirectional signals.

9. The method of claim 5, wherein said ECHO signal transmissions are omnidirectional signals.

10. The method of claim 4, further comprising the steps of:
f) encrypting, by said first validating satellite node, said PING signal transmission time to create an encrypted PING signal transmission time; and
g) adding the encrypted PING signal transmission time to said PING signal, using a private encryption key that is only known to said first validating satellite node and is stored in said first validating satellite node's memory;
wherein said PONG signal further comprises said encrypted PING signal transmission time; and
wherein, in step d), the PING transmit time is further defined as being the PING transmit time recovered from the PONG signal by decrypting the encrypted PING transmit time as received in said PONG signal using said private encryption key.

11. The method of claim 4, further comprising the steps of encrypting the UUID prior to adding to the PING signal using a private encryption key that is only known to said first validating satellite node and is stored in said first validating satellite node's memory; and
adding the step of decrypting the encrypted UUID as returned in the PONG signal to verify that the PONG signal is authentic.

12. A system for validating a proposing satellite node in a blockchain network, using Proof of Location (POL), comprising:
a blockchain network comprising a plurality of satellite nodes, at least a portion of the satellite nodes being in RF communication with one another, at least some of the satellite nodes operating as validating satellite nodes, and at least one of the satellite nodes operating as the proposing satellite node desiring to be validated;
wherein each of said satellite nodes is also in data communication with one another for the purpose of communicating blockchain messages; and
wherein each of said satellite nodes comprises a processor in communication with a non-transitory memory, a local time base for determining local time to a desired precision, and a transceiver;
wherein each of said satellite nodes contains a copy of a blockchain ledger in memory; and
wherein said memory of each of said satellite nodes contains computer readable and executable instructions for 1) executing blockchain transactions; and 2) to assemble and transmit a PING signal able to be received by said at least one of said plurality of satellite nodes operating as the proposing satellite node, receive a PONG signal from said at least one proposing satellite node on the network, transmit an ECHO signal to said other satellite nodes operating as validating satellite nodes on the network, to communicate with the other satellite nodes on the blockchain network for the purpose of communicating blockchain messages, and to carry out steps for validating the proposing satellite node, comprising:
aa) determining, by each satellite node operating as a validating satellite node, a lightsphere for the proposing satellite node, said lightsphere representing a maximum distance from each satellite node operating as a validating satellite node to the proposing satellite node;
bb) communicating, by each satellite node operating as a validating satellite node to each other satellite node operating as a validating satellite node, the lightsphere for the proposing satellite node;
cc) determining, by each satellite node operating as a validating satellite node, a geospatial position for the proposing satellite node, by performing computations on the lightsphere for the proposing satellite node provided by each satellite node operating as a validating satellite node;
dd) determining, for the proposing satellite node, whether the proposing satellite node's geospatial position may be determined within a predetermined margin of error;
ee) declaring, by each satellite node operating as a validating satellite node, that the proposing satellite node is validated if the geospatial position for the proposing satellite node falls within the predetermined margin of error;
wherein the step (aa) of determining, by each satellite node operating as a validating satellite node, a lightsphere for the proposing satellite node is further defined as comprising the steps of:
sending, from a first validating satellite node, a first validating node PING signal;
receiving, by said proposing satellite node, said first validating node PING signal;
transmitting, by said proposing satellite node, a first validating node PONG signal in a direction and with sufficient power that said first validating node PONG is receivable by said first validating satellite node;

transmitting, by said first validating satellite node, an ECHO signal, wherein said ECHO signal comprises the first validating satellite node unique node name, the unique node name of the proposing satellite node, and the radius the of the lightsphere for said proposing satellite node as determined by said first validating satellite node;

repeating, the steps of transmitting and receiving PING, PONG and ECHO signals, by said plurality of satellite nodes operating as validating satellite nodes, wherein each ECHO signal is received by the other satellite nodes operating as validating satellite nodes; and determining a validated geospatial position of said proposing satellite node, by each satellite node operating as a validating satellite node, by using 1) each validating satellite node's knowledge of its own geospatial position, 2) the lightsphere as determined by each satellite node operating as a validating satellite node for the proposing satellite node, and 3) using computational techniques for determining the geospatial position of said proposing satellite node.

13. The system of claim 12, wherein the computer readable instructions further comprise instructions for writing each proposing satellite node's validated geospatial position to the distributed blockchain ledger.

14. The system of claim 12, wherein:

said first validating node PING signal comprises at least a first validating satellite node unique node name and a Universally Unique IDentifier (UUID) specific to the first validating satellite node that the first validating satellite node randomly generates via a means that is difficult or impossible for other nodes to guess the UUID to be generated; and the computer readable instructions further comprise instructions for:

ff) modifying, by said proposing satellite node, said first validating satellite node PING signal by adding a unique node name for said proposing satellite node to the PING signal to create a first validating satellite node PONG signal;

gg) receiving, by said first validating satellite node, said first validating satellite node PONG signal;

hh) determining, at said first validating satellite node, a maximum distance of the proposing satellite node from the first validating satellite node by dividing the signal velocity by half of the round trip signal transmission time, thus establishing a maximum distance from said first validating satellite node to said proposing satellite node, and further determining a first validating satellite node lightsphere for said proposing satellite node, wherein said first validating satellite node lightsphere for said proposing satellite node is centered at the first validating satellite node's geospatial location, and has a radius equal to said maximum distance from said first validating satellite node to said proposing satellite node.

15. The system of claim 12, wherein said memory further comprises instructions for providing a reward to each of said satellite nodes operating as validating satellite nodes.

16. The system of claim 14, wherein all signal transmissions are radio frequency (RF) radiated emissions.

17. The system of claim 14, wherein said PING signal transmissions are omnidirectional signals.

18. The system of claim 14, wherein said PONG signal transmissions are omnidirectional signals.

19. The system of claim 15, wherein said ECHO signal transmissions are omnidirectional signals.

20. The system of claim 14, where said memory further comprises instructions for: encrypting, by said first validating satellite node, said PING signal transmission time to create an encrypted PING signal transmission time; and adding the encrypted PING signal transmission time to said PING signal, using a private encryption key that is only known to said first validating satellite node and is stored in said first validating satellite node's memory; wherein said PONG signal further comprises said encrypted PING signal transmission time.

21. The system of claim 14, wherein said memory further comprises instructions for encrypting the UUID prior to adding to the PING signal using a private encryption key that is only known to said first validating satellite node and is stored in said first validating satellite node's memory; and for decrypting the encrypted UUID as returned in the PONG signal to verify that the PONG signal is authentic.

* * * * *